(12) United States Patent
Eoga (10) Patent No.: US 7,261,241 B2
(45) Date of Patent: *Aug. 28, 2007

(54) HEATING AND COOLING ENERGY SAVING DEVICE

(76) Inventor: Anthony B. Eoga, 321 Rexland Dr., Boonton, NJ (US) 07005

( * ) Notice: Subject to any disclaimer, the term of this patent is extended or adjusted under 35 U.S.C. 154(b) by 491 days.

This patent is subject to a terminal disclaimer.

(21) Appl. No.: 10/764,646

(22) Filed: Jan. 24, 2004

(65) Prior Publication Data

US 2004/0177629 A1    Sep. 16, 2004

Related U.S. Application Data

(63) Continuation-in-part of application No. 09/898,203, filed on Jul. 3, 2001, now Pat. No. 6,688,384.

(51) Int. Cl.
F24F 11/00 (2006.01)
F24F 11/04 (2006.01)

(52) U.S. Cl. ............ 236/1 B; 236/49.3; 236/91 F; 62/178; 165/212; 165/217; 165/48.1; 165/247

(58) Field of Classification Search ............ 236/1 B, 236/1 C, 49.3, 91 F; 62/178, 179, 180, 186; 165/292, 299, 300, 212, 217, 247, 48.1, 253, 165/254, 255, 259, 208, 209, 210, 211; 454/256
See application file for complete search history.

(56) References Cited

U.S. PATENT DOCUMENTS 3,018,712 A * 1/1962 Wacker ............ 454/192
4,108,375 A * 8/1978 Keeney ............ 237/8 R
4,215,408 A * 7/1980 Games et al. ............ 700/278
4,347,712 A * 9/1982 Benton et al. ............ 62/175
4,531,573 A * 7/1985 Clark et al. ............ 165/216
4,716,957 A * 1/1988 Thompson et al. ............ 165/209
4,718,021 A * 1/1988 Timblin ............ 700/277
5,024,379 A * 6/1991 Dempsey ............ 237/16
5,407,002 A * 4/1995 Voll ............ 165/11.1
6,105,927 A    8/2000 Zelczer et al.
6,688,384 B2 * 2/2004 Eoga ............ 165/212

* cited by examiner

*Primary Examiner*—Marc Norman
(74) *Attorney, Agent, or Firm*—Lawrence A. Aaronson (57) ABSTRACT

A system for regulating the temperature of multiple areas within a facility using multiple energy savings devices (ESD) that each regulate the temperature of individual rooms or areas within a facility having a central heating and cooling plant. The device includes a fan and thermostats to control the temperature in each room. A first thermostat is located within the energy savings device to activate a fan only when a baseboard-heating element, cooling element or conduit provides a pre-selected sufficient temperature level range to activate a fan. Another thermostat is located remotely in each room and communicates to each ESD to deactivate the fan when the temperature in any room exceeds or is less than the desired temperature level. The desired temperature level may be higher or lower than a main thermostat setting that controls the central heating and cooling plant, in accordance with a heating or cooling mode, respectively.

14 Claims, 3 Drawing Sheets

Cooling Mode

Heating Mode

US 7,261,241 B2

HEATING AND COOLING ENERGY SAVING DEVICE

CROSS-REFERENCE TO RELATED APPLICATIONS

This application is a continuation-in-part of, and claims the benefit of priority to, U.S. patent application Ser. No. 09/898,203, filed Jul. 3, 2001, now U.S. Pat. No. 6,688,384.

FIELD OF THE INVENTION

The present invention relates to heating and cooling systems. In particular, the present invention relates to an energy savings device used within conventional heating and cooling systems that regulates the temperature of predetermined areas of a facility and reduces the overall cost associated with heating and cooling the facility.

BACKGROUND OF THE INVENTION

Figure 1:
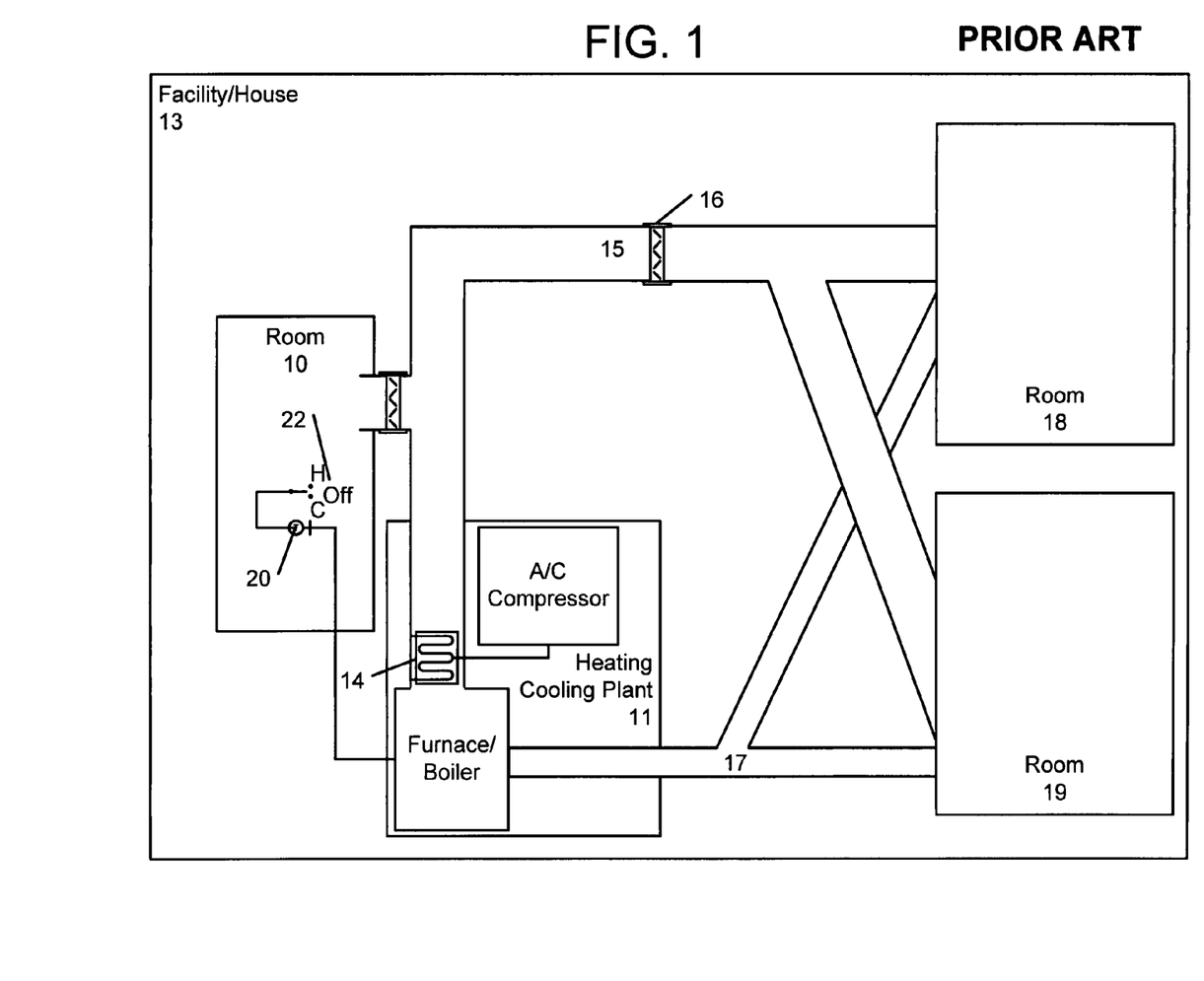
FIG. 1 illustrates a conventional single zone forced air heating and cooling system.

FIG. 1 illustrates a conventional single zone (i.e., whole house) forced air heating and cooling system, which typically employs a single central heating and cooling plant 11 with respective conduits 15 and 17 to transfer the heated or cooled air to all the various areas or rooms 10, 18 and 19 serviced. In such systems, a single (main) control thermostat 20 and heating/cooling mode control 22 is typically located in one of the cooled or heated areas or rooms serviced (e.g., room 10) to control the temperature of an entire facility or household 13. In conventional hot water heat systems, boiler and/or water cooler is employed to heat or cool water which is circulated pipes (which would augment or replace conduits 15 and 17) to heat exchangers (not shown) located in various rooms 10, 18 and 18. Like forced air systems, the single (main) thermostat 20 and mode control is typically located in one of the many heated or cooled rooms to automatically control the temperature for the entire facility or household 13.

In the above systems, conduits 15 and 16 transfer the heated or cooled fluid or air to each area or room 10, 18 or 19 serviced. Such systems are limited in that they fail to adequately provide for the automatic, individual temperature control in each of the rooms or areas. For example, dampers 16 are often utilized to alter airflow within the supply conduit 15 to balance the heating and cooling throughout the facility or household 13 to more evenly heat/cool the facility. In an attempt to overcome the limitations of the single zone systems of FIG. 1 and to conserve energy many homes have multiple zone heating and cooling systems, each zone being a subset of the entire facility 13. These systems require the installation of separate heating/cooling plants 11 for each zone. While more efficient than single zone systems, such systems are disadvantageous due to the prohibitively high costs of installing separate heating/cooling plants and conduits or pipes for each zone.

Another disadvantage of conventional single zone systems is that in homes that employ a single main thermostat 20 for all the rooms 10, 18 and 19, all of the rooms are heated or cooled to substantially the same temperature without any provision to control and maintain the individual room temperatures during the period of use or non-use. This condition results in the wasting and excess use of energy. For example, because the facility thermostat 20 is in room 10, it is not possible to raise the temperature of room 18 to 70° F. while maintaining the other rooms 10 and 19 at 60° F. It is not possible to do so as the heating plant 11 will turn-off when room 10 reaches 60° F., which will be before room 18 reaches 70° F. Dampers 16 or room vents (not shown) may be adjusted to divert warm air to room 18, however, this too fails to accurately vary and control the individual room temperatures. Other systems, such as that described in U.S. Pat. No. 6,105,927 to Zelczer et al. disadvantageously require flow control devices that close the fluid flow.

In view of the foregoing, there is a need for a device that will individually control room temperatures in facilities having a conventional heating/cooling plants. There is also a need for a device that reduces energy consumption with minimal compromise in comfort. Further, there is a need for the device to operate in both heating and cooling environments, baseboard heating systems, and forced air systems. Yet further, the device should be relatively cost effective in achieving these needs. The present invention provides such a system.

SUMMARY OF THE INVENTION

The present invention provides an area or room temperature control apparatus for a central heating and/or cooling systems having a central fluid heating or cooling plant or a central forced air heating or cooling plant with respective conduits which direct the heated or cooled fluid or air to the individual rooms being serviced by the same system in a home or an office complex. The area temperature control apparatus operates automatically to control the temperature in each individual room within a predetermined temperature range during any particular time period. It also operates to reduce unnecessary heating or cooling of individual rooms or areas consisting of one or more rooms during cyclical periods of use, whereby substantial energy savings may be realized with minimal compromise to comfort. More particularly, the area temperature control apparatus operates within heating/cooling systems to deliver heated or cooled air to individual rooms within a facility to maintain individual rooms substantially at a predetermined temperature after a first (main) thermostat controlling the heating/cooling plant is activated and the respective conduits attain a prescribed temperature.

The energy savings device (ESD) of the present invention provides for individual control of the temperature of each room within the facility. This device provides a fan and two additional thermostats to control the temperature in each room. One thermostat is located in the ESD to activate a fan only when the baseboard-heating element, cooling element, or conduit temperature provides a pre-selected sufficient temperature level range to activate a fan. The fan size is designed to provide sufficient air transfer capacity to increase or decrease the temperature of any room. The speed of the fan preferably provides airflow that exceeds the airflow velocity of the facility heating and cooling unit. The other thermostat is located remotely in each room and deactivates the fan when the temperature in any room exceeds or is less than the desired temperature level. Such a unit provides for increased comfort and energy savings from the reduced heating or cooling of rooms not in use, while reducing the environmental impact due to the efficiency of the unit.

BRIEF DESCRIPTION OF THE DRAWINGS

The foregoing summary, as well as the following detailed description, is better understood when read in conjunction with the appended drawings. For the purpose of illustrating the invention, like references numerals represent similar parts throughout the several views of the drawings, it being understood, however, that the invention is not limited to the specific methods and instrumentalities disclosed. In the drawings.

DETAILED DESCRIPTION OF THE INVENTION

The present invention provides an area or room temperature control apparatus that operates within central heating and/or cooling systems having a central fluid heating or cooling plant or a central forced air heating or cooling plant with respective conduits which direct the heated or cooled fluid or air to the individual rooms being serviced in a home or an office complex. The area temperature control apparatus operates automatically to control the temperature in each individual room within a prescribed temperature range during any particular time period. It also operates to reduce unnecessary heating or cooling of individual rooms or areas consisting of one or more rooms during cyclical periods of use, whereby substantial energy saving may be realized with minimal compromise to comfort. More particularly, the area temperature control apparatus operates on the system to deliver heated or cooled air to individual rooms to substantially regulate the room temperature at a predetermined temperature after a first (main) thermostat controlling the heating/cooling plant is activated and the respective conduits attain a prescribed temperature.

Briefly, the multi-area temperature control system of the present invention includes one or more energy savings devices (ESD) operatively associated with the respective fluid conduits or the radiant heating elements in the central heating or the central cooling system plant. When a room is to be heated or cooled to a certain predefined temperature range, the ESD employs a thermostat sensor which activates a fan when the common radiant heating element or conduit, or the common cooling element or conduit from the common plant delivers a prescribed minimum high temperature level or a prescribed maximum low temperature level, respectively. When the temperature in the area or room under control reaches a prescribed maximum temperature level (in the heating mode) or a prescribed minimum temperature level (in the cooling mode) respectively, the ESD fans are operatively de-energized by another thermostat, which is located at a predetermined minimum distance from the terminal end of the fluid conduit of the radiant heating source or the cooling source so as not to be reactive or operatively associated with any immediate contact with the respective fluid conduits or the radiant heating element in the central heating system plant. The ESD is adapted to cycle control, such that the room temperature may be maintained at the prescribed level. This system advantageously eliminates the need to have flow control devices, since the second thermostat will not activate the fan until the fluid conduits or the radiant heating or cooling elements reach prescribed temperature levels. The ESD operates under these conditions to accelerate the movement of conditioned fluid air into a room when the temperature of the fluid air attains a prescribed temperature level. This feature prevents the continuous delivery of unheated air or non-cooled air from a heating or cooling system.

Figure 2:
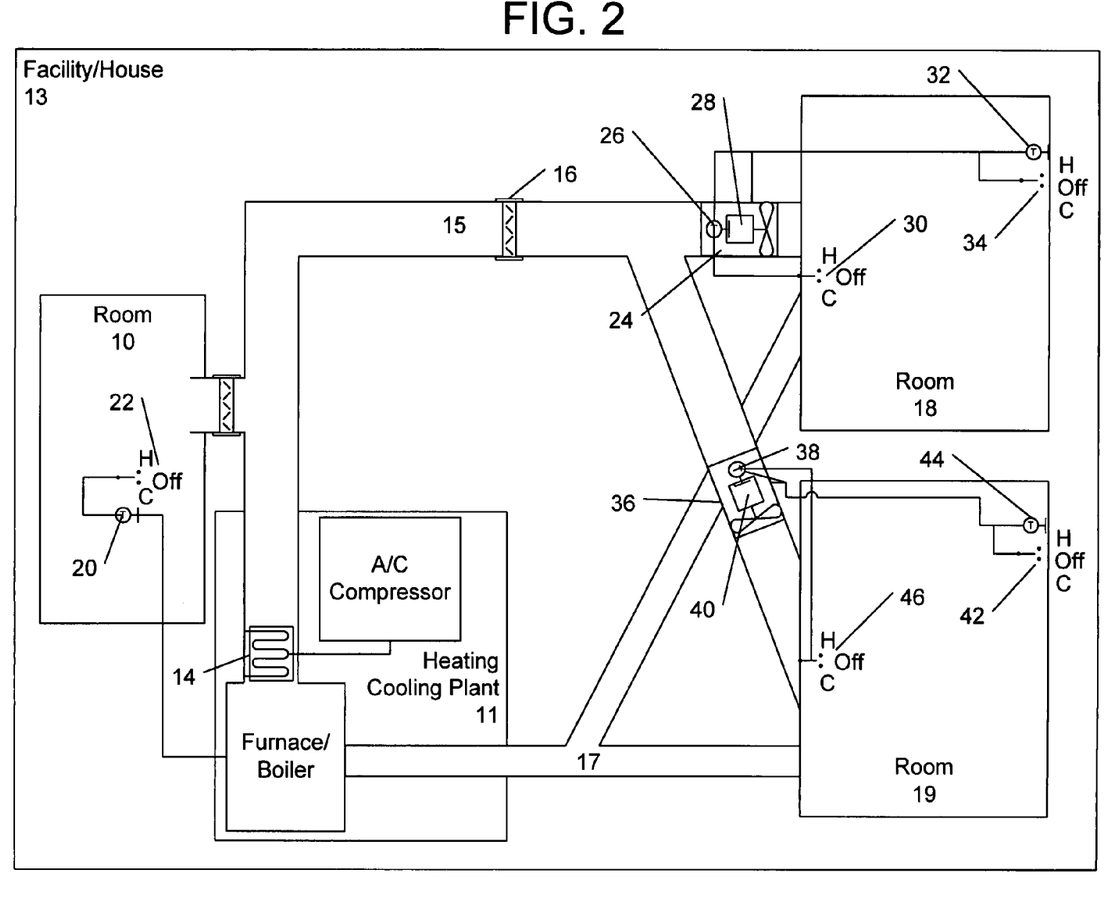
FIG. 2 illustrates a single zone forced air heating and cooling system with the energy savings device of the present invention.

Referring now to FIG. 2, there is illustrated an exemplary single zone, three room facility having a forced air heating and cooling system having a single heating/cooling plant 11 and incorporating the multi-area temperature control system of the present invention. Operatively engaging the conduits 15 that supply each of rooms 18 and 19, is an ESD 24 and 36 of the present invention. The ESDs 24 and 36 each comprise a thermostat 26 and 38, respectively, and a fan 28 and 40, respectively, preferably contained within a housing. The housing is adapted to operatively connect to the conduit exits or, in the case of baseboard heating, the thermal transfer areas (e.g., fins and/or shroud) of the baseboard heater. The thermostats 26 and 28 monitor the common source fluid (air) temperature within the conduit 15 for a predetermined minimum high temperature level or a predetermined maximum temperature level, in accordance with a mode of operation (to be described below). The fans 28 and 40 provide for adequate air movement from the conduit 15 such that the ESD may transfer thermal energy from the fluid within the conduit 15 to accelerate heating or cooling of rooms 18 and 19, respectively. Preferably, the fan speed on each ESD unit 24/36 used for hot air and cooling air systems is a rate that moderately increases the volume of air per minute provided by that of the heating and cooling plant 11. The fans 28 and 40 are adapted to be shut down when heating or cooling of the rooms 18 and/or 19 is not required. It is preferable that the capacity of the fans 28 and 40, in volume/minute, exceed the capacity of the main heating and/or cooling fan (in plant 11). The ESD 24/36 can be used to completely reduce the heating or cooling quickly when such heating or cooling is not required.

The ESD 24/36 does not substantially restrict or preferentially shut-off the flow of conditioned fluid through the associated conduit 15 to thereby separate or isolate the corresponding room 18 or 19 from the plant 11, and hence preclude the direct heating or cooling of any room 18 or 19. Preferably the ESD 24/36 is located in or on the entrance of the conduits to each room and separate from the heating/cooling plant 11.

Attached to each ESD 24 and 36 is a room thermostat 32 and 44, respectively. As will be described below, the room thermostats 32 and 44 are operatively connected (directly or wireless) to the ESDs 24/36 to shutdown the ESDs when a predetermined room temperature is attained. This in conjunction with thermostats 26 and 38 preferably provides for ESD operation only when the temperature of the room 10r the temperatures of heating or cooling conduits attain predetermined temperature levels during periods of actuation of the facility heating/cooling plant 11 by the thermostat 20. It is noted that electronic transmitters and receivers may be employed to provide for the control of the temperature in each room through the use of remote control of thermostats 32 and 44, adjustment of the thermostats 26 and 38 associated or attached to the ESD. The remote thermostats 32/44 are preferably located on a wall distant from the common radiative heating element, the heated air source, the common cooling element, or a cooled air source within the room, so they will not directly respond to the outlet, but rather the resultant average temperature of the room. It is preferable that the thermostats 32/44 be located minimally 6-8 feet from the ESD thermostat 26/38, respectively.

It is noted that present invention provides for ESD units that may be retrofitted to older established homes and commercial establishments, and for new construction, whereby the immediate pre-wiring of the ESD and the remote thermostats 32/44 may be accomplished. It is further noted that at first glance it would be easy to place a fan behind the baseboard-heating element, or within the conduit 15, to move air surrounding the baseboard-heating element or within the conduit to raise or lower the temperature in a particular room. However, this procedure will vary the temperature of the room in an uncontrolled manner as there are no controls (i.e., remote thermostats) to limit the amount of heating or cooling of the room. In addition, the ESD of the present invention preferably provides an ESD thermostat to turn on and off the ESD fan such that the fan does not run when the heating/cooling plant 11 is not running, or when the conduits 15 are not sufficiently warm/cool to achieve the desired temperature in the room.

The operation of the ESD will now be described. For heating, the cycle, programmable or regular house (main) thermostat 20 is set to the heating position (e.g., "H" position of selector switch 22) and lowest desired temperature for any room 10, 18 or 19. If the room 10 containing the house (main) thermostat 20 requires a higher temperature, then set the cycle, programmable or regular house (main) thermostat 20 at that higher temperature. Next, the ESD 24/36 cycle, programmable or regular remote thermostat 32/44 is set to the heating mode ("H" position on selector switch 34/42) and the desired temperatures for each room is set on the thermostats 32/44. Then, the ESD 24/36 mode is set to the "H" position on selector switch 30/46 to heat any room, or alternatively, set to the "Off" position to maintain a lower temperature in any room.

For cooling (e.g., "C" position on selector switch 22), set the cycle, programmable or regular house (main) thermostat 20 to the highest desired temperature for any room 10, 18 or 19. If the room 10 containing the house (main) thermostat 20 requires a lower temperature, then set the cycle, programmable or regular house (main) thermostat 20 at that lower temperature. Then, set the ESD 24/36 cycle, programmable or regular remote thermostat 32/44 to the "C" position (of selector 34/42) and the desired temperatures for each room. Next, set the ESD Mode to the "C" position (of selector 30/46) to lower the temperature in any room. Alternatively, set the ESD Mode to the "Off" position to maintain a higher temperature in any room.

It is noted that for best results, each room is preferably separated by closed doors unless two or more rooms are to be maintained at the same temperature. The first (main) thermostat 20 will continue to operate to provide heated or cooled air to the rooms not controlled by an ESD in order to provide minimal heated or cooled air to those rooms, if desired. In order to achieve significant heat energy savings with minimal compromise to comfort, the temperature setting of the first thermostat 20 may be set at a higher temperature in the evening and a lower temperature during the day if the home is not being used during the day and vice versa. For considerable energy savings, a programmable thermostat may be used as the main thermostat 20 to accommodate the actual use conditions.

The following Table 1 describes how ESDs are placed within a home 13 having a central fluid heating or cooling plant 11, and in particular, represents an exemplary four-room home. Where applicable, the reference numbers in Table 1 correspond the reference numerals in FIG. 2. With regard to elements not shown in FIG. 2, such elements are represented by new reference numerals. Operational conditions and scenarios to reduce energy usage follow.

TABLE 1

|  | Room | | | |
| --- | --- | --- | --- | --- |
|  | 10 | 18 | 19 | R4 |
| Main Thermostat | 20 | — | — | — |
| ESD Thermostat |  | 26 | 38 | T24 |
| Remote Thermostat |  | 32 | 44 | T34 |

Scenario I

The following procedure will allow for one room to be heated to a relatively higher temperature than the other rooms with the main thermostat not in the room to be controlled at a higher temperature. In this scenario, the following operative conditions apply: the outside temperature is lower than 60° F., the desired temperature level is 70° F. for one of the rooms (room 19), and the desired temperature for the other rooms is 60° F. The setting for the main thermostat 20 in room 10 is set at 60° F., and the remote thermostats 32 and 44 are set at 60° F. and 70° F., respectively. In room R4, the remote thermostat T34 is set to 60° F. The ESD thermostats 26, 38 and T24 are set at 180° F., 90° F. and 180° F., respectively. It is noted that 180° F. is intended to represent a sufficiently high temperature of the fluid within conduit 15 such that conduit temperature does not reach this temperature, effectively turning off the ESD. Alternatively, the selector 30 may be set in the "Off" position.

Under the above conditions, an ESD fan with a sufficient air transfer capacity in the ESD 36 in room 19 will be energized by the thermostat 38 when the common radiative heating element reaches 90° F. The thermostats 26 and T24 in rooms 18 and R4 will be energized only if the common radiative heating element reaches 180° F. Since the thermostat 38 in the ESD in room 19 will be energized first in accordance with the lower setting at 90° F., the temperature in room 19 will be raised to 70° F. due to the air transfer capacity of the fan 40. When the temperature in room 19 reaches 70° F., the thermostat 44 will de-energize the ESD device 36 in order to maintain the temperature at 70° F. However, the temperature in rooms 10, 18 and R4 will slowly rise until the temperature in these rooms reaches 60° F., in accordance with the main thermostat 20. Thus, because the rooms 10, 18 and R4 are not heated much higher than 60° F., a reduced amount of energy is used while maintaining room 19 at 70° F.

Scenario II

The following procedure will allow for one room to be cooled to a relatively lower temperature than the other rooms, because the main thermostat is not in the same room 18s the room to be controlled at a lower temperature. The operative conditions are as follows for this scenario. The outside temperature is higher than 80° F., and the desired temperature level is 70° F. for one of the rooms (room 19) and the desired temperature for the other rooms is 80° F. The setting for the main thermostat 20 in room 10 is set at 80° F. and the settings for the remote thermostats 32, 44 and T34 are set at 80° F., 70° F. and 80° F., respectively. The ESD thermostats 26, 38 and T24 are set at 10° F., 40° F. and 10° F., respectively. It is noted that 10° F. is intended to represent a sufficiently low temperature of the fluid within conduit 15 such that conduit temperature does not reach this temperature, effectively turning off the ESD. Alternatively, the selector 30 may be set in the "Off" position.

Under the above conditions, an ESD fan with a sufficient air transfer capacity in the ESD 36 in room 19 will be energized by the thermostat 38 when the common cooling element falls to 40° F. The thermostats 26 and T24 in rooms 19 and R4 will be energized only if the common cooling element falls to 10° F. Since the thermostat 38 in the ESD in room 19 will be first energized in accordance with the higher setting of 40° F., the temperature in room 19 will be cooled to 70° F. due to the air transfer capacity of the fan 40. When the temperature in room 19 is lowered to 70° F., the thermostat 44 will de-energize the ESD 36 in order to maintain the temperature at 70° F. However, the temperature in room 10, 18 and R4 will be maintained at 80° F. in accordance with the setting of the main thermostat 20 and with the remote thermostats 32, T34. Thus, because the rooms 18 and R4 are not cooled much lower than 80° F., a reduced amount of energy is used while maintaining room 19 at 70° F.

Scenario III

The following procedure will allow for two rooms to be heated to a relatively higher temperature than the other rooms with the main thermostat in one of the rooms to be controlled at a higher temperature. In this scenario, the operative conditions are as follows. The outside temperature is lower than 60° F. and the desired temperature level is 60° F. for room 10, which has the main thermostat 20 and the desired temperature for the other three rooms is 60° F. for room 18, 70° F. for room 19, and 70° F. for room R4. Accordingly, the temperature setting for the first thermostat 20 in room 10 is set at 60° F., and the settings for the remote thermostats 32, 44 and T34 are 60° F., 70° F. and 70° F., respectively. In order to achieve the above-desired temperature levels, the ESD thermostats 26, 38 and T24 are set to 180° F., 90° F. and 90° F., respectively. It is noted that 180° F. is intended to represent a sufficiently high temperature of the fluid within conduit 15 such that conduit temperature does not reach this temperature, effectively turning off the ESD. Alternatively, the selector 30 may be set in the "Off" position.

Under the above conditions, an ESD fan with a sufficient air transfer capacity in the ESD in room R4 and room 19 will be energized by the ESD thermostats T24 and 38 respectively when the common radiative heating element reaches 90° F. The ESD thermostat 26 in room 18 will be energized only if the common radiative heating element reaches 180° F. Because the thermostat T24 and 38 in rooms R4 and 19 will be energized first due to the lower setting at 90° F., the temperature in rooms R4 and 19 will reach 70° F. due to the air transfer capacity of ESD fans. When the temperature in room R4 and 19 reaches 70° F., the thermostats T34 and 44 will de-energize the ESD devices in order to maintain the temperature at 70° F. However, the temperature in rooms 18 and 10 will slowly rise until the temperature reaches 60° F., in accordance with the main thermostat 20 setting of 60° F. and the remote thermostat 32, which is also set at 60° F. Thus, because the rooms 18 and 10 are not heated much higher than 60° F., a reduced amount of energy is used while maintaining room 10 and R4 at 70° F.

Scenario IV

If it is desired to raise the temperature in two or more of the rooms in the home 13 to a relatively different higher temperature and the other two rooms at a lower temperature, the following procedure will allow for such room temperatures. In this scenario, the following operative conditions apply. The outside temperature is lower than 60° F. and the desired temperature level is 80° F. for room R4, 70° F. for room 19, and 60° F. for room 18 and room 10, which has the main thermostat 20. The temperature setting for the first thermostat 20 in room 10 is set at 60° F., and the remote thermostats 32, 44 and T34 are set to 60° F., 70° F. and 80° F., respectively. In order to achieve the above temperature levels, the ESD thermostats 26, 38 and T24 are set to 180° F., 120° F. and 110° F. It is noted that 180° F. is intended to represent a sufficiently high temperature of the fluid within conduit 15 such that conduit temperature does not reach this temperature, effectively turning off the ESD. Alternatively, the selector 30 may be set in the "Off" position.

Under the above conditions, an ESD fan with a sufficient air transfer capacity in the ESD in rooms R4 and 19 will be energized by the ESD thermostats T24 and 38 when the common radiative heating element first reaches 110° F. and 120° F., respectively. The ESD thermostat 26 in room 18 will be energized only if the common radiative heating element reaches 180° F. Because the thermostats T24 and 38 in the ESD in rooms R4 and 19 will be energized first due to the lower settings of 110° F. and 120° F., respectively, the temperature in rooms R4 and 19 will reach 80° F. and 70° F., respectively, due to the air transfer capacity of the ESD fan. When the temperature in room R4 and 19 reaches 80° F. and 70° F., respectively, the thermostats T34 and 44 will de-energize the ESDs in order to maintain the temperature at 80° F. and 70° F., respectively. However, the temperature in rooms 18 and 10 will slowly rise until reaching 60° F., in accordance with the main thermostat 20 (set at 60° F.) and the remote thermostat 32 (set at 60° F.). Thus, because the rooms 18 and 10 are not heated much higher than 60° F., a reduced amount of energy is used while maintaining rooms R4 and 19 at 80° F. and 70° F.

Scenario V

The following procedure will allow for two or more rooms to be cooled to a relatively higher temperature than the other rooms. The operative conditions for this scenario are as follows. The outside temperature is higher than 80° F. and the desired temperature level is 70° F. for room R4, and 75° F. for room 19. The desired temperature for the other two room 18 and room 10 is 80° F., which has the main thermostat 20 (set at 80° F.). The temperature settings for remote thermostats 32, 44 and T34 are set to 80° F., 75° F. and 80° F., respectively. The ESD thermostats 26, 38 and T24 are set to 10° F., 30° F. and 40° F., respectively.

Under the above conditions, an ESD having an ESD fan having a sufficient air transfer capacity in rooms R4 and 19 will be energized by the ESD thermostats T24 and 38 when the common cooling element reaches 40° F. and 30° F., respectively. The ESD thermostat 26 in rooms 18 will be energized only if the common cooling element reaches 10° F. Since the thermostat T24 and 38 in rooms R4 and 19 will be energized first due to the higher setting at 40° F. and 30° F., respectively, the temperature in rooms R4 and 19 will be lowered to 70° F. and 75° F., respectively, due to the air transfer capacity of the fan. When the temperature in rooms R4 and 19 reaches 70° F. and 75° F., respectively, the thermostats T34 and 44 will de-energize the ESDs in order to maintain the temperature at 70° F. and 75° F., respectively. However, the temperature in rooms 18 and 10 will be slowly lowered until the temperature in rooms 18 and 10 reach 80° F., which are controlled by the main thermostat 20, which is set at 80° F., and the remote thermostat 32, which is also set at 80° F. Thus, because the rooms 18 and 10 are not cooled much lower than 80° F., a reduced amount of energy is used while maintaining room R4 and 19 at 70° F. and 75° F.

In the discussion above the ESD of the present invention has been described as operatively engaging forced air heating/cooling systems. It is noted that hot water heating and cooling systems operate in substantially the same manner as the exemplary forced air heating and cooling system of FIG. 2. Based on the discussion above, one of ordinary skill in the art would understand that the ESD of the present invention may be fashioned to mount the radiant elements of a baseboard heating/cooling system. Thus, the ESD may be energized/de-energized as noted above in accordance with the temperatures of the radiant elements and the room 10*r* area to be controlled, respectively.

In order to more effectively control the amount of warm or cool air entering a room, it may be preferable to control the setting of ESD thermostat as a function of the room thermostat setting. As will be described in detail below, a more effective means of maintaining any room at any temperature, is to vary the ESD thermostat 26/38 setting that is used to activate the fan over a range of temperatures based on the temperature setting of the room thermostat 32/44 that is used to deactivate the fan. The range of temperatures is determined in accordance with the size of the fan and speed of the fan. In other words, the larger or faster the fan, the more closely the ESD thermostat setting may be to the room thermostat setting. In accordance with this feature of the invention, the room thermostat 32/44 automatically adjusts the ESD thermostat 26/38 once a certain sized fan and fan speed is chosen for the ESD.

In particular, in order to increase or decrease the temperature of any room more effectively to a desired temperature in the heating mode, the ESD thermostat 26/38 is preferably set to activate the fan at a lower temperature in order to more effectively maintain any room at a higher temperature. The ESD thermostat 26/38 may also be set to activate the fan at a higher temperature in order to more effectively maintain any room at a lower temperature. In the heating mode, the ESD thermostat temperatures are preferentially set between 60° F. and 160° F. To increase or decrease the temperature of any room more effectively to a desired temperature in the cooling mode, the ESD thermostat 26/38 is preferably set to activate the fan at a lower temperature in order to more effectively maintain any room at a higher temperature. The ESD thermostat 26/38 may also be set to activate the fan at a higher temperature in order to more effectively maintain any room at a lower temperature. In the cooling mode, the ESD thermostat temperatures are preferentially set between 25° F. to 60° F. This feature will be more fully described below.

Once the room thermostat 32/44 setting is chosen, the ESD thermostat 26/38 will be automatically adjusted to the required temperature. This can be done in one of many ways. For example, the room thermostat may include a circular plate that will automatically set the ESD thermostat 26/38 situated in the conduit 15 to activate the fans 28 and 40 at a predetermined temperature. The room thermostat 32/44 will also deactivate the fan when a room attains a desired temperature.

Figure 3:
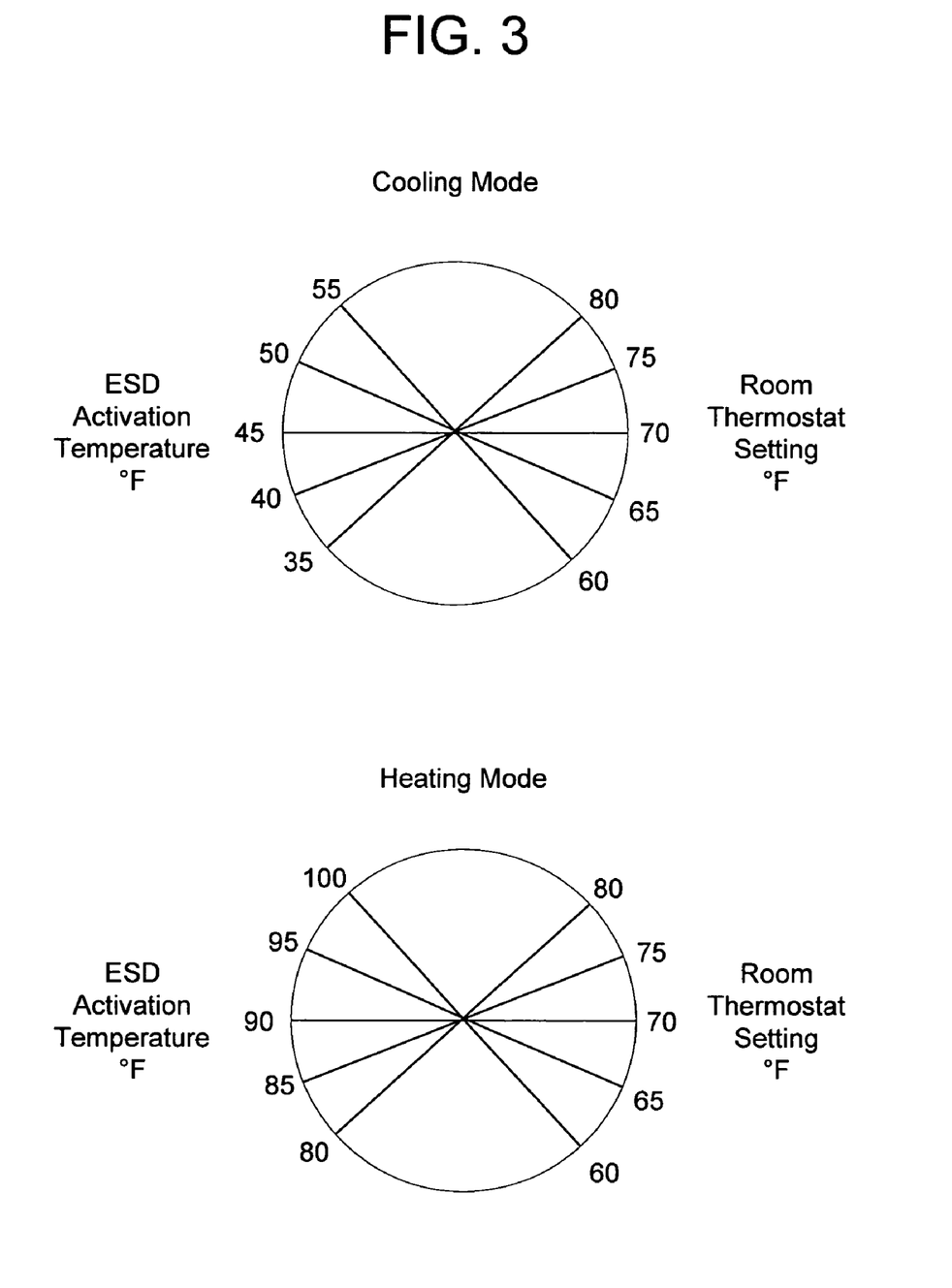
FIG. 3 illustrates an exemplary circular plate that may be affixed to a thermostat to set an ESD thermostat.

An exemplary circular plate is illustrated in FIG. 3. The circular plate is operatively connected to a settable rotary face of the room thermostat that is rotated by users to set a desired temperature of the area under control. The right-hand side of the circular plate is the temperature set by the user, which correlates to the appropriate ESD thermostat setting for the room (180° from the temperature set by the user) on the left-hand side of the plate. In operation, a potentiometer may be used to adjust a variable output voltage that is communicated to the ESD thermostat via an electrical or radio frequency link.

Alternatively, if the room thermostat 32/44 includes a microcontroller and a digital display, a look-up table, such as Table 2, may be implemented in firmware that correlates the user-set temperature with the appropriate ESD thermostat setting for the room. When a user programs the temperature setting into the room thermostat, the microcontroller performs a look-up to fetch the ESD thermostat setting from memory and communicates it to the ESD thermostat via an electrical or radio frequency link.

TABLE 2

|  | Room Thermostat Setting (° F.) | ESD Activation Temperature (° F.) |
| --- | --- | --- |
| Cooling Mode | 80 | 35 |
|  | 75 | 40 |
|  | 70 | 45 |
|  | 65 | 50 |
|  | 60 | 55 |
| Heating Mode | 80 | 80 |
|  | 75 | 85 |
|  | 70 | 90 |
|  | 65 | 95 |
|  | 60 | 100 |

Thus, the thermostat is designed such that a change to the room thermostat 32/44 setting automatically provides for the appropriate change on the ESD thermostat 26/38. It is noted that a change to the room thermostat 32/44 setting may not result in a proportional change in setting of the ESD thermostat on a linear scale. In other words, although FIG. 3 and Table 2 disclose a linear relationship between the room thermostat setting and the ESD thermostat setting, there may be a non-linear relationship between variations in the room thermostat setting and the ESD thermostat settings.

The actual comfort of any room will depend upon the actual size of any room and the recommended upper capacity of the ESD is approximately 300 to 350 sq. ft. In the event one room is more than 50% of the size of any other room, it may be preferable to use two units in the larger room.

Thermostat Setting Procedure for Cooling I

If the required temperature in room 18 is 65° F., the ESD thermostat 26 will activate the fan 28 when the plenum conduit 15) temperature is reduced to 50° F. or less. The room thermostat 32 will shut down the fan 28 when the temperature reaches 65° F. If the required temperature in room 19 is 70° F., the ESD thermostat 38 will activate the fan 40 when the plenum temperature is reduced to 45° F. or less. The room thermostat 44 will shut down the fan 40 when the temperature reaches 70° F. This will preferentially provide the room that requires the lower temperature (i.e., room 18) with cool air from the plenum via the ESD before other rooms (i.e., room 19) receive cool air from the plenum.

If the required temperature in room 10 has been set at 60° F. and the ESD room thermostat for room 10 (not shown) has been set at 60° F., the ESD thermostat (not shown) will activate the fan when the plenum temperature is reduced to 55° F. or less in order to reduce the temperature to 60° F. Concurrently the room thermostat will shut down the fan when the temperature reaches 60° F.

Therefore, according to this procedure, the activation of the heating and cooling plant 11 by the main thermostat 20 will preferentially affect room 10. Room 10 will be first room to receive cooled air through the activation of the fan system as it has the highest ESD temperature setting. Since most central air conditioners produce a plenum temperature of 40° F. or less with sufficient capacity, the reduction in temperature to 65° F. and 70° F. for rooms 18 and 19, respectfully, is achievable.

Thermostat Setting Procedure for Cooling II

If the required temperature in room 18 is 60° F., the ESD thermostat 26 will activate the fan 28 when the plenum temperature is reduced to 55° F. or less. The room thermostat 32 will shut down the fan 28 when the temperature reaches 60° F. If the required temperature in room 19 is 65° F., the ESD thermostat 38 will activate the ESD fan 40 when the plenum temperature is reduced to 50° F. or less. The room thermostat 44 will shut down the fan 40 when the temperature reaches 65° F. This will provide the room that requires the lower temperature (i.e., room 18) with cool air from the plenum before other rooms (i.e., room 19) receive cool air from the plenum via the ESD.

If the required temperature in room 10 has been set at 70° F. and the ESD thermostat (not shown) has been set at 70° F., the ESD thermostat will activate the fan only when the plenum temperature is reduced to 45° F. or less in order to reduce the temperature to 70° F. Concurrently the room thermostat (not shown) will shut down the fan when the temperature reaches 70° F.

Therefore, according to this procedure, the activation of the heating and cooling plant 11 by the main thermostat will preferentially affect room 18. Room 18 will be first room to receive cooled air through the activation of the ESD fan. Because most central air conditioners produce a plenum temperature of 40° F. or less with sufficient capacity, the reduction in temperature to 60° F. and 65° F. for room 18 and 19, respectfully, is achievable due to the operation of the ESD.

Thermostat Setting Procedure for Heating I

If the required temperature in room 18 is 65° F., the ESD thermostat 26 will activate the fan 28 when the plenum temperature reaches 95° F. The room thermostat 32 will shut down the fan 28 when the temperature reaches 65° F. If the required temperature in room 19 is 70° F., the ESD thermostat 38 will activate the fan 40 when the plenum temperature reaches 90° F. The room thermostat 44 will shut down the fan 40 when the temperature reaches 70° F. This will provide the room that requires the higher temperature (i.e., room 19) with heat from the plenum preferentially before other rooms (i.e., room 18) receive heat from the plenum via the ESD.

If the required temperature in room 10 is 60° F., the main thermostat 20 is set at 60° F. and the room thermostat (not shown) is also set at 60° F. The ESD thermostat (not shown) will activate the fan only when the plenum temperature reaches 100° F. The room thermostat will shut down the fan when the temperature reaches 60° F. Therefore, the activation of the heating and cooling plant 11 by the main thermostat 20 will affect room 10 until room 10 reaches 60° F., which will be after rooms 18 and 19 have achieved their required heat settings due to the operation of the ESDs 24/36.

Thermostat Setting Procedure for Heating II

If the required temperature in room 18 is 60° F., the ESD thermostat 26 will activate the fan 28 when the plenum temperature reaches 100° F. The room thermostat 32 will shut down the fan 28 when the temperature reaches 60° F. If the required temperature in room 19 is 65° F., the ESD thermostat 38 will activate the fan 40 when the plenum temperature reaches 95° F. The room thermostat 44 will shut down the fan 40 when the temperature reaches 65° F. This will provide the room that requires the higher temperature (i.e., room 19) with heat from the plenum preferentially before other rooms (i.e., room 18) receive heat from the plenum.

If the required temperature in room 10 is 70° F., the main thermostat 20 is set at 70° F. and the ESD room thermostat (not shown) is also set at 70° F. The ESD thermostat (not shown) will activate the fan when the plenum temperature reaches 90° F. The room thermostat will shut down the fan when the temperature reaches 70° F. Therefore, the activation of the heating and cooling plant 11 by the main thermostat will affect room 10 until room 10 reaches 70° F., which will be after rooms 18 and 19 have achieved their lower heat settings.

It is noted that the foregoing scenarios and setting procedures are provided for exemplary purposes only and alternate scenarios are possible such as different heating and cooling configurations and additional or fewer rooms to be controlled. It is also noted that the exemplary embodiment FIGS. 2 and 3 have been presented for use in a three-room facility for the purpose of drawings' clarity and is not limited to such facilities.

In view of the above detailed description, various other modifications and variations will now become apparent to those skilled in the art. It is intended that the present invention of the appended claims cover all reasonable modifications and variations without departing from the spirit and scope of the invention. In particular, more than four storage sections may be employed and the process of writing and restructuring between storage sections may be varied, but remain within the scope of the appended claims.

What is claimed is:

1. A system for maintaining user-selected temperatures in multiple areas within a facility having a heating and cooling plant having conduits that circulate fluid for transferring or removing heat from the multiple areas within the facility, the system comprising:

area thermostats, each area thermostat sensing a temperature of a particular area within the facility and comparing the sensed temperature of said particular area to a user-selected temperature for said particular area; and energy savings devices, each energy savings device being associated with a respective area thermostat, each energy saving device comprising:

a housing adapted to be secured to the conduits;

a first thermostat receiving a first pre-selected temperature setting from said respective area thermostat, said first pre-selected temperature being determined in accordance with said user-selected temperature, said first thermostat sensing the temperature of the fluid within one of the conduits and comparing the sensed temperature of the fluid to said first pre-selected temperature, the fluid attaining said first pre-selected temperature based on the operation of said facility heating and cooling plant; and a fan contained within said housing, said fan being in electrical communication with said first thermostat and with said respective area thermostat and operational to transfer heat to, or remove heat from, said particular area of the facility to substantially maintain said area near said user-selected temperature for said particular area, wherein said fan is energized when the fluid attains said first pre-selected temperature and is de-energized when said area of the facility attains said user-selected temperature for said particular area.

2. The system of claim 1, wherein said facility heating and cooling plant is operating in a heating mode, and said first pre-selected temperature settings of said energy savings devices are higher than said user-selected temperatures of said area thermostats.

3. The system of claim 2, wherein a highest user-selected temperature of any of said area thermostats correlates to a lowest of said first pre-selected temperature settings of said energy savings devices.

4. The system of claim 3, wherein successively lower user-selected temperatures of particular areas of said facility correlate to successively higher first pre-selected temperature settings of said energy savings devices, and
wherein a lowest user-selected temperature correlates to a highest first pre-selected temperature.

5. The system of claim 1, wherein said facility heating and cooling plant is operating in a cooling mode, and said first pre-selected temperature settings of said energy savings devices are lower than said user-selected temperatures of said area thermostats.

6. The system of claim 5, wherein a lowest user-selected temperature of any of said area thermostats correlates to a highest of said first pre-selected temperature settings of said energy savings devices.

7. The system of claim 6, wherein successively higher user-selected temperatures of particular areas of said facility correlate to successively lower first pre-selected temperature settings of said energy savings devices, and
wherein a highest user-selected temperature correlates to a lowest first pre-selected temperature.

8. A method of operating a system having energy savings devices to regulate the temperature within multiple areas under thermal control in a facility having a heating and cooling plant that has conduits that circulate fluid for transferring or removing heat from the multiple areas, each of the energy savings devices being associated with a particular area within the facility wherein each particular area has a respective area thermostat set to a user-selected temperature, said method comprising:
energizing each of said energy savings devices when a temperature of the fluid crosses a threshold first pre-selected temperature setting in a first direction, the fluid attaining said first pre-selected temperature based on the operation of said facility heating and cooling plant, said threshold first pre-selected temperature setting of each energy savings device be obtained from said respective area thermostat in accordance with said user-selected temperature;
each energy savings device transferring thermal energy from the fluid to each particular area of the facility under thermal control;
regulating said particular area of the facility to said user-selected temperature for said particular area and de-energizing each said energy savings device once said user-selected temperature is attained in said particular area of the facility; and
thereafter, cycling each said energy savings device to substantially maintain said particular area of the facility at said second user-selected temperature until the temperature of the fluid within the conduits crosses said threshold first pre-selected temperature in a second direction opposite said first direction.

9. The method of claim 8, wherein said facility heating and cooling plant is operating in a heating mode, and said first pre-selected temperature settings of said energy savings devices are higher than said user-selected temperatures of said area thermostats.

10. The method of claim 9, wherein a highest user-selected temperature of any of said area thermostats correlates to a lowest of said first pre-selected temperature settings of said energy savings devices.

11. The method of claim 10, wherein successively lower user-selected temperatures of particular areas of said facility correlate to successively higher first pre-selected temperature settings of said energy savings devices, and
wherein a lowest user-selected temperature correlates to a highest first pre-selected temperature.

12. The method of claim 8, wherein said facility heating and cooling plant is operating in a cooling mode and said first pre-selected temperature settings of said energy savings devices are lower than said user-selected temperatures of said area thermostats.

13. The method of claim 12, wherein a lowest user-selected temperature of any of said area thermostats correlates to a highest of said first pre-selected temperature settings of said energy savings devices.

14. The method of claim 13, wherein successively higher user-selected temperatures of particular areas of said facility correlate to successively lower first pre-selected temperature settings of said energy savings devices, and
wherein a highest user-selected temperature correlates to a lowest first pre-selected temperature.

* * * * *